(12) United States Patent
Matsushita et al.

(10) Patent No.: US 6,207,723 B1
(45) Date of Patent: Mar. 27, 2001

(54) RUBBER COMPOSITION AND METHOD FOR PRODUCING THE SAME

(75) Inventors: Mitsumasa Matsushita; Makoto Mouri; Hirotaka Okamoto; Norio Sato, all of Aichi; Yasuyuki Suzuki, Toyota; Masao Owaki, Aichi-ken; Noriyuki Suzuki, Toyota; Katsumi Nakashima; Hidenobu Honda, both of Ichinomiya; Toru Yoshida, Nagoya; Katsumasa Takeuchi, Ichinomiya, all of (JP)

(73) Assignees: Kabushiki Kaisha Toyota Chuo Kenkyusho, Aichi-Ken; Toyota Jidosha Kabushiki Kaisha, Toyota; Toyoda Gosei Co., Ltd., Aichi-Ken, all of (JP)

( * ) Notice: Subject to any disclaimer, the term of this patent is extended or adjusted under 35 U.S.C. 154(b) by 0 days.

(21) Appl. No.: 09/236,445

(22) Filed: Jan. 25, 1999

(30) Foreign Application Priority Data

Jan. 26, 1998 (JP) .................................................. 10-029345
Jan. 27, 1998 (JP) .................................................. 10-030605
Feb. 19, 1998 (JP) .................................................. 10-056170

(51) Int. Cl.⁷ ................................ C08J 11/04; B02B 3/06
(52) U.S. Cl. ........................... 521/41; 525/236; 525/237; 241/23; 241/60; 241/65; 241/260.1
(58) Field of Search ................................ 521/41; 241/23, 241/60, 65, 260.1; 264/DIG. 69; 525/236, 237

(56) References Cited

U.S. PATENT DOCUMENTS

| 2,461,192 | 2/1949 | Banbury et al. . |
|---|---|---|
| 3,210,301 | 10/1965 | White . |
| 5,312,573 | 5/1994 | Rosenbaum et al. ........... 264/211.12 |
| 5,397,065 | * 3/1995 | Shutov et al. ......................... 241/16 |
| 5,514,721 | 5/1996 | Hart ....................................... 521/41 |

FOREIGN PATENT DOCUMENTS

| 0 657 263 | 6/1995 | (EP) . |
|---|---|---|
| 0 744 436 | 11/1996 | (EP) . |
| 0 887 372 | 12/1998 | (EP) . |
| 54-22478 | 2/1979 | (JP) . |
| 56-76439 | 6/1981 | (JP) . |
| 5-329842 | 12/1993 | (JP) . |
| 5-329843 | 12/1993 | (JP) . |
| 6-210633 | 8/1994 | (JP) . |
| 6-220255 | 8/1994 | (JP) . |
| 8-134223 | 5/1996 | (JP) . |
| 9-227724 | 9/1997 | (JP) . |
| WO 93/20132 | 10/1993 | (WO) . |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

The present invention provides a rubber composition containing a reclaimed rubber and a method for producing the same. A rubber molded article having excellent rubber properties can be obtained and the recycling of a used rubber product can be promoted by the present invention.

A rubber composition of the present invention is a blend comprising a claimed rubber obtained by applying a heat and a shear stress to a vulcanized rubber, a non-vulcanized virgin rubber or/and a thermoplastic resin, wherein the reclaimed rubber contains 40% by weight or more of a residual toluene-insoluble gel component and the network chain density of the rubber in the gel component is 1/20 to 1/4 based on the network chain density of the rubber of the vulcanized rubber.

21 Claims, 2 Drawing Sheets

Fig. 1

(53,000 x magnification)

(13,000 x magnification)

RUBBER COMPOSITION AND METHOD FOR PRODUCING THE SAME

BACKGROUND OF THE INVENTION

1. Field of the Invention

The present invention relates to a rubber composition utilizing a reclaimed rubber obtained by reclamation of a vulcanized rubber such as a waste tire and also relates to a method for producing the same.

2. Description of the Related Arts

Substantial issues on the recycling of industrial wastes arose in response to an increasing consciousness of environmental protection in these days. In such circumstances, a rapid improvement in the recycling efficiency of a rubber product such as a waste tire is desired.

Conventionally, a rubber product such as a waste tire has generally been reused as a kiln fuel for a cement or as a reclaimed rubber, while the reuse as a reclaimed rubber to be recycled again as a rubber product is most desirable.

Some conventional methods for reclaiming a vulcanized rubber are exemplified below.

(1) A reclaiming agent is added to a coarsely pulverized vulcanized rubber and the mixture is heated in an autoclave (for example in a condition of at 200° C. and 14.5 kg/cm$^2$ for 5 hours) and then refined using a finishing roll, whereby obtaining a reclaimed rubber. This method is referred to as PAN method.

However, a reclaimed rubber obtained by PAN method described above or a re-vulcanized rubber obtained therefrom by means of re-vulcanization of the reclaimed rubber exhibits a low strength when used alone, and thus is a rubber whose application range is extremely limited. As a result, it is difficult to use such reclaimed rubber alone to form a practical rubber product (including re-vulcanized rubber and the like).

Accordingly, it has been attempted that the reclaimed rubber discussed above is added as an additive to a virgin rubber to obtain a rubber molded article for which the consumption of the virgin rubber is reduced.

(2) A method has been known in which a vulcanized rubber is pulverized into a particle whose particle size is several hundreds $\mu$m and then added to a non-vulcanized virgin rubber. Also in this case, a rubber molded article for which the consumption of the virgin rubber is reduced can be obtained.

However, even when a reclaimed rubber is added to a virgin rubber, the fracture properties, the abrasion resistance, the curing properties and the like are affected adversely, and furthermore, even when a vulcanizing agent is added subsequently to conduct re-vulcanization, it is still difficult to produce a practical rubber product.

Further, a blend rubber obtained by mixing a pulverized vulcanized rubber with a virgin rubber readily undergoes a destruction occurring initially at an interface between a molecule of the vulcanized rubber and a molecule of the virgin rubber due to an insufficient binding at this interface. Accordingly, it is difficult to obtain an excellent reclaimed rubber of a satisfactory quality by these methods for reusing.

(3) A method for reusing a vulcanized rubber (for example a waste tire) containing a thermoplastic resin fiber such as a rubber waste is disclosed in Japanese Laid-Open Patent Publication No.56-76439. This method utilizes a simple reclaiming process. Thus, a vulcanized rubber powder from, for example, a rubber waste is devulcanized to plasticized material, kneaded together with a sulfur and then kneaded again together with a thermoplastic resin having a rubber-like elasticity with heating at a temperature not lower than a vulcanization temperature, whereby obtaining a material for injection molding.

A method disclosed in Japanese Laid-Open Patent Publication No.56-76439 involves the following problems in addition to the problems involved in PAN method discussed above.

[1] The steps of producing are complicated, time and labor consuming and expensive.

[2] A sulfur should be added for re-vulcanization in order to improve adhesion properties and physical properties.

[3] Since a devulcanized rubber supplemented with a vulcanizing agent and a thermoplastic resin are kneaded with heating at a temperature not lower than the vulcanization temperature, the devulcanized rubber disperses throughout the entire thermoplastic resin phase, while being re-vulcanized. In such a process, micro-dispersion is difficult to be achieved, and a composition as an alloy of a rubber phase and a thermoplastic resin phase can not be obtained.

[4] Although a material for injection molding can be obtained from a vulcanized rubber such as a rubber waste and a thermoplastic resin having a rubber-like elasticity, the resultant material becomes a rubber-like elastomer, whose range of application is limited and whose technological utility is also poor.

(4) When a vulcanized rubber such as a rubber waste containing a thermoplastic resin fiber is reclaimed in PAN method, the standard processing temperature of PAN method which is not higher than the melting point of a the thermoplastic resin allows the shape of the fiber to be kept as it was in the reclaimed rubber and also allows a strainer to be plugged readily. In addition, the fiber engages with each other to form an aggregation when the finishing roll was employed in the condition mentioned above, resulting in the aggregation part in which the fiber is poorly dispersed, which may affect the surface quality and the physical properties of a molded article which is a re-vulcanized material.

Even when a vulcanized rubber such as a rubber waste still containing a thermoplastic resin fiber is treated at a temperature not lower than the melting point of the thermoplastic resin, the molten thermoplastic resin aggregates to form a bulky particle of several hundreds $\mu$m or larger since it has not been subjected to a sheer stress. As a result, a part containing this bulky particle serves to deteriorate the surface quality and the physical properties of a molded article which is a re-vulcanized material.

(5) Japanese Patent Application Laid-Open No.5-329842 discloses a method for obtaining a rubber product in which the shape of the fiber contained in the rubber is kept as it was.

A method according to Japanese Laid-Open Patent Publication No. 5-329842 involves a problem similar to that experienced in PAN method. Accordingly, a re-vulcanized material of a rubber obtained can be used only in an article whose surface quality is not taken into account, such as those employed in construction and building works.

The conventional methods described above such as the rubber powder method and PAN method can also be applied to the reuse of a vulcanized rubber such as a rubber waste containing a fiber, if the fiber has previously be removed. For this purpose, however, pulverization by means of, for example, freeze-grinding should be followed by separation by means of such as blow-sieving, resulting in a high cost.

SUMMARY OF THE INVENTION

The object of the present invention is therefore to provide a rubber composition containing a reclaimed rubber which can provide a rubber material and a thermoplastic material having excellent rubber properties by a simple and economical step and can promote recycling of a used rubber product and also a method for producing the same.

Accordingly, the present invention is a rubber composition comprising a reclaimed rubber obtained by applying a heat and a shear stress to a vulcanized rubber, a non-vulcanized virgin rubber or/and a thermoplastic resin, wherein said reclaimed rubber contains 40% by weight or more of a residual toluene-insoluble gel component and the network chain density of the rubber in said gel component is 1/20 to 1/4 based on the network chain density of the rubber of the vulcanized rubber.

The aspect of the present invention is further detailed below.

A rubber composition according to the present invention contains a reclaimed rubber. This reclaimed rubber contains 40% by weight or more of a residual toluene-insoluble gel component from the vulcanized rubber.

The network chain density of the rubber in the gel component is 1/20 to 1/4 based on that of the rubber of the vulcanized rubber. The gel component amount and the network chain density of the rubber in the gel component show that the rubber molecule keeps a crosslinking structure.

Such a reclaimed rubber has a fluidity and a compatibility with a virgin rubber or/and a thermoplastic resin and can be dispersed finely throughout the virgin rubber or/and the thermoplastic resin. Accordingly, the reclaimed rubber described above binds readily with the virgin rubber or/and the thermoplastic resin, resulting in an improved or higher rubber property of a rubber composition containing the blend of the both.

The term "a higher rubber property" means that when a reclaimed rubber described above is re-vulcanized to form a re-vulcanized rubber molded article, the properties of the re-vulcanized rubber molded article, such as tensile strength, elongation at break and elasticity, are equivalent to or better than those of an article prepared from a virgin rubber and a reclaimed rubber obtained by a conventional method or/and a thermoplastic resin.

In addition, since a certain amount of a reclaimed rubber is added to a virgin rubber or/and a thermoplastic resin in a rubber composition according to the present invention, the corresponding using amount of the virgin rubber or/and the thermoplastic resin can be saved. As a result, the recycling of a used rubber product can be promoted.

As mentioned above, the present invention can provide a rubber composition containing a reclaimed rubber which can provide a rubber molded article having excellent rubber properties and can promote the recycling of a used rubber product.

Also provided is a method for producing a rubber composition comprising the steps of:

treating a vulcanized rubber with a heat and a shear stress to obtain a reclaimed rubber wherein 40% by weight or more of a residual toluene-insoluble gel component is present and the network chain density of the rubber in said gel component is 1/20 to 1/4 based on the network chain density of the rubber of the vulcanized rubber; and, blending said reclaimed rubber with a non-vulcanized virgin rubber or/and a thermoplastic resin.

According to these methods, a rubber composition having the excellent properties as discussed above can be obtained.

Also provided is a method for producing a rubber composition comprising: heating and applying a shear stress to a vulcanized rubber together with a thermoplastic resin at a temperature not lower than the melting point of the thermoplastic resin and also not lower than the devulcanizing temperature of the vulcanized rubber.

According to this method, a vulcanized rubber is devulcanized to form a reclaimed rubber, which together with a thermoplastic resin forms a rubber composition of the rubber and the thermoplastic resin.

DETAILED DESCRIPTION OF THE INVENTION (1) Addition of Reclaimed Rubber to Virgin Rubber A rubber composition according to the present invention is a rubber composition which is a blend comprising a reclaimed rubber obtained as a result of reclaiming process by applying a heat and a shear stress to a vulcanized, rubber and a non-vulcanized virgin rubber, wherein the reclaimed rubber, which are preceded to the other bonding, preferably contains 40% by weight or more of a residual toluene-insoluble gel component and the network chain density of the rubber in said gel component is 1/20 to 1/4 based on the network chain density of the rubber of the vulcanized rubber.

In this reclaimed rubber, 40% by weight or more of a toluene-insoluble gel component in the vulcanized rubber remains.

The network chain density of the rubber in the gel component is 1/20 to 1/4 based on that of the vulcanized rubber. This means that the rubber molecule e retains a crosslinking structure therein.

Such a reclaimed rubber has a fluidity and is highly compatible with a virgin rubber, and can be dispersed finely throughout the virgin rubber. As a result, this reclaimed rubber binds readily with the virgin rubber, resulting in a high rubber property of a rubber composition containing a blend of the both.

The term "a higher rubber property" means that when a reclaimed rubber described above is re-vulcanized to form a re-vulcanized rubber molded article, the properties of the re-vulcanized rubber molded article, such as tensile strength, elongation at break and elasticity, are equivalent to those of a vulcanized rubber article prepared from a virgin rubber or better than those of a reclaimed rubber obtained by a conventional method.

In addition, since a certain amount of a reclaimed rubber is added to a virgin rubber in a rubber composition according to the present invention, the corresponding amount of the virgin rubber can be saved. As a result, the recycling of a used rubber product can be promoted.

A method according to the present invention is a process in which a heat and a shear stress are applied in combination to reclaim a vulcanized rubber to obtain a rubber composition of a high quality which can not be obtained at all when reclaiming is conducted only with either of the heat or the shear stress.

When a tire (a blend of a natural rubber and a butadiene-based rubber) is reclaimed by a conventional method such as reclamation only by heating (PAN method), cutting of crosslinking points of sulfur, for example, and of a main chain of the natural rubber takes place, resulting in softening, which is accompanied with simultaneous hardening due to oxidation of the butadiene-based rubber.

In PAN method, this deterioration of the natural rubber and the butadiene-based rubber can be controlled by adjusting the treatment conditions, in this case however, a reclamation degree of the vulcanized rubber may be lowered and its compatibility with the virgin rubber may further be degraded. Accordingly, a reclaimed rubber obtained by such a conventional method can be applied only to limited uses.

On the other hand, the concomitant use of a heat and a shear stress is employed to reclaim a vulcanized rubber in the present invention. It was discovered that the present invention promotes the crosslinking point cutting due to the effect of the shear stress and suppresses the deterioration of the rubber.

On a tire which a rubber composition according to the present invention is added to, deterioration of tire properties can be reduced and also the amount of a non-vulcanized virgin rubber consumed can be reduced due to the added rubber composition made from a reclaimed rubber, whereby making it very preferable in view of resource saving as well as recycling.

Also the reclamation conducted in this method under a shear stress allows particles of the gel component in the reclaimed rubber to be pulverized finely. Accordingly, this leads to an improved appearance and mechanical properties of a rubber product obtained by re-vulcanization.

On the other hand, a plasticizing treatment is performed using a roll after reclamation in the conventional PAN method, but it was difficult to pulverize the particle of the gel component to a smaller size which is achieved by the present invention only by using the roll.

When the amount of a toluene-insoluble gel component is less than 40% by weight, the cutting of the main chain of the rubber molecule may unfavorably take place in addition to the crosslinking cutting, resulting in a tendency of increase in tackiness, which may lead to deteriorated physical properties.

The upper limit of the gel component content is preferably less than 80% by weight. A content not less than 80% by weight may cause an insufficient reclamation of a vulcanized rubber, which may lead to reduction in dispersibility in a non-vulcanized virgin rubber. As a result, the surface quality and the mechanical properties of a rubber product obtained may adversely be affected.

A gel component described above may vary depending on the types of vulcanized rubbers, and, for example, includes a polymer gel formed by three-dimensional crosslinking of a rubber, a carbon gel made from a rubber and a carbon black, and an inorganic substances such as carbon black.

In a reclaimed rubber containing a butadiene component such as butadiene rubbers, styrene-butadiene rubbers and acrylonitrile-butadiene rubbers, it is preferable that 50% or more of the terminal vinyl groups of the butadiene component of the vulcanized rubber remains in the reclaimed rubber after reclamation.

This allows the butadiene component to keep its rubber properties. At a content less than 50%, the rubber properties are lost and the mechanical properties of a rubber molded article are degraded. Also when such a rubber composition is used as a material for a tire, a substantial reduction in the abrasion resistance may occur and it may be difficult to obtain a tire exhibiting a practical performance.

A larger residual amount of a butadiene rubber is more preferable since it allows the properties of a butadiene rubber to be maintained more easily.

When a network chain density of the rubber in the gel component exceeds 1/4 based on the network chain density of the vulcanized rubber, reclamation is insufficient and the dispersibility in and the compatibility with a non-vulcanized rubber are degraded. As a result, the surface quality and the mechanical properties of a rubber product obtained may adversely be affected. On the other hand, a density less than 1/20 may cause the cutting of the main chain of the rubber molecule in addition to the crosslinking cutting, resulting in a tendency of increase in tackiness, which may lead to deteriorated physical properties.

(2) Vulcanized Rubber

An example of the vulcanized rubber described above is a substance obtained by mixing a raw rubber which is a cluster of long chain organic substances having carbon main chains with a vulcanizing agent such as sulfur, a sulfur compound or a peroxide to form various sulfur crosslinkings such as a —S— bond, a —S—S— bond and a —S—S—S— bond between the carbon main chains whereby imparting an elastomer- or rubber-like physical state. Further, the vulcanized rubber is preferably allowed to be in a state yielding a radical by selectively cutting the crosslinkings upon application of a heat and a shear stress.

A chain organic compound described above includes natural rubbers, butadiene rubbers, isoprene rubbers, butyl rubbers, ethylene-propylene rubbers, styrene-butadiene rubbers, chloroprene rubbers, nitrile rubbers, acryl rubbers, acrylonitrile-butadiene rubbers, epichlorohydrin rubbers, chlorosulfonated polyethylenes, chlorinated polyethylenes, silicon rubbers, EPDM (ethylene-propylene-diene terpolymer) and the like.

As a vulcanized rubber discussed above, a rubber product such as a tire is employed preferably.

Since tires are especially disposed in large amounts, reuse of such tires heightens a recycling efficiency.

While a vulcanized rubber may consist of one material, it may be a mixture of two or more materials. The state of the mixture may be a cluster of rubber bulks having sizes within a certain range, or may be a dispersion with a size of 1 mm or less. A mixture of two or more types of the pulverized materials of a single vulcanized substance may also be employed.

When the vulcanized rubber is formed of two or more types, rubbers to be combined may not particularly be specified basically, but the combination of rubbers having a closer molecule structure and a closer polarity is more preferable in view of obtaining a reclaimed product having stable properties. For example, a combination of a natural rubber and a styrene-butadiene rubber or a natural rubber, a styrene-butadiene rubber and a butadiene rubber may be mentioned.

A vulcanized rubber can be obtained from various rubber materials.

For example, rubber products such as rubber tires, weather strips, hoses, piston cups, belts, floor carpets and the like, used rubber materials to be disposed, non-used materials as scraps from virgin rubber materials, unsuccessfully rubber molded articles may be employed. Although these rubber materials may be used as a mixture, it is preferable to use a single material for the purpose of obtaining a reclaimed article having stable properties.

(3) Reclamation Degree of Vulcanized Rubber

The mechanical properties of a vulcanized rubber reclaimed material in a rubber composition vary depending on the reclamation degrees of vulcanized rubbers. The reclamation degree of a vulcanized rubber can be represented as a weight swelling degree of a vulcanized rubber reclaimed material in a rubber composition or a % by weight of a gel (gel fraction).

When the weight swelling degree of a vulcanized rubber reclaimed in a rubber composition is lower than the degree twice that before reclamation, the reclamation is insufficient, and a mixture in which a vulcanized rubber pulverized by a shear stress is merely admixed with a thermoplastic resin is obtained. In such a mixture, the vulcanized rubber is poorly compatible with a thermoplastic resin and may cause the deterioration of the mechanical properties. As a result, a rubber composition According to the present invention may not be obtained.

With regard to the % by weight of a gel of a rubber polymer component in a rubber composition is preferably 20 to 70% by weight of rubber polymer component of the vulcanized rubber. A gel present in an amount less than 20% may cause not only the cutting of the crosslinkings but also the cutting of the main chain, which may lead to deterioration in the mechanical properties. When a gel is present in an amount exceeding 70% by weight, the reclamation becomes insufficient, and a mixture in which a vulcanized rubber pulverized by a shear stress is merely admixed with a thermoplastic resin is obtained. In such mixture, the vulcanized rubber is poorly compatible with a thermoplastic resin and may cause the deterioration of the mechanical properties. As a result, a rubber composite according to the present invention may not be obtained.

When a carbon black is added to the rubber composition, as mentioned hereinafter, a gel is preferably present in an amount exceeding 20% by weight to suppress the migration of the carbon black into a thermoplastic resin. When a gel is present in an amount less than 20%, the cutting of the main chain of a rubber is proceeded and may cause a surface of a molded article exhibiting undesirable stickiness and bleed-out of a degradation product.

The above % by weight of the gel (gel fraction) of a rubber polymer component means a ratio of the polymer component which is toluene-insoluble in the polymer component contained in a vulcanized rubber before reclamation.

(4) Reclaimed Rubber

The Mooney viscosity of the reclaimed rubber($ML_{1+4}$, 100° C.) is preferably within a range from 10 to 120. When the Mooney viscosity exceeds 120, reclamation of the rubber may not performed sufficiently. When the Mooney viscosity is less than 10 on the contrary, a main chain of the rubber may be cut, resulting in deterioration of the properties of the rubber composition due to tackiness.

Sulfur crosslinkings formed between carbon main chains of the reclaimed rubber include a —S— bond, a —S—S— bond, a —S—S—S— bond and the like. It is preferable that 90% or more of the total number of crosslinkings are the —S— bond. When the —S— bond is less than 90%, the ratio of the —S—S— bond and the —S—S—S— bond both of which have a weak bond strength may increase, and this leads to an excessive cuttings of the crosslinkings in a blend of the virgin rubber or/and the thermoplastic resin, resulting degraded physical properties.

In the description of the present invention, the term "reclamation" means the devulcanization of a vulcanized rubber to achieve a state in which the reuse of the rubber is possible with and without re-vulcanization the rubber. The composite may also be obtained by means of a chemical bond between a radical of a rubber and a thermoplastic resin.

(5) Non-Vulcanized Virgin Rubber

Examples of a non-vulcanized virgin rubber are natural rubbers, butadiene rubbers, isoprene rubbers, butyl rubbers, ethylene-propylene rubbers, styrene-butadiene rubbers, chloroprene rubbers, nitrile rubbers, acryl rubbers, epichlorohydrin rubbers, silicon rubbers, EPDM and the like.

(6) Weight Ratio of Reclaimed Rubber to Virgin Rubber

The combination of a reclaimed rubber with a virgin rubber may be a combination of two or more types of rubbers having identical compositions or a combination of two or more types of rubbers having different compositions.

The type of a reclaimed rubber and a virgin rubber may not particularly be specified basically, but rubbers having a closer molecule structure and a closer polarity is more preferable in view of obtaining a reclaimed article having stable properties. For example, a combination of a natural rubber and a styrene-butadiene rubber or a natural rubber, a styrene-butadiene rubber and a butadiene rubber may be mentioned. A method for reclaiming a vulcanized rubber is described later.

A preferred weight ratio of a reclaimed rubber to a virgin rubber to be combined is 100 or less to 100 parts by weight.

Such a weight ratio allows a moldability, mechanical properties and a surface quality, which are similar to those of a single virgin rubber, to be achieved.

A ratio exceeding 100 parts by weight of the reclaimed rubber may cause a poorer moldability, poorer mechanical properties and a poorer surface quality. Since too small an amount of a reclaimed rubber to be added does not achieve the purpose of recycling a used rubber molded article, it is preferable to add at least 5 parts by weight of a reclaimed rubber to a virgin rubber.

(7) Dispersing States of Reclaimed Rubber

A reclaimed rubber in a rubber composition according to the present invention is preferably present as being dispersed in a form of a microparticle having a maximum particle size of 100 $\mu$m or less. Such a state of the dispersion serves to prevent the reduction in the surface quality and also in the material mechanical properties.

For obtaining a rubber composition in such a state, a reclaimed rubber may be added to a virgin rubber in an ordinal manner employed for kneading a rubber. Mixing is preferably effected by using a roll, a kneader, an extruder and the like. On the other hand, when the maximum particle size exceeds 100 $\mu$m, the surface quality of the molded article and physical properties of the rubber composition may be degraded. It is further preferable that the maximum particle size is 100 $\mu$m or less while the average particle size is 10 $\mu$m or less.

It is preferable that a reclaimed rubber binds chemically to a virgin rubber or/and a thermoplastic resin at a radical active point on the surface of the reclaimed rubber. In such a manner, a strong binding between the reclaimed rubber and a virgin rubber or/and a thermoplastic resin is ensured whereby exhibiting a novel property which has not been experienced.

(8) Thermoplastic Resin

A thermoplastic resin may be a composite with a rubber material. Such a composite includes, for example, a rubber carpet having a thermoplastic resin as a backing liner or/and a top skin and a hose reinstressd with a thermoplastic resin fiber. When a composite consisting of a vulcanized rubber and a thermoplastic resin is employed as a rubber material, a rubber composition of the present invention can be obtained without incorporation of an additional thermoplastic resin. The additional thermoplastic resin may also be added.

A rubber composition which has already been reclaimed may also be employed as a rubber material.

A thermoplastic resin has a heat fusing capability, and is generally in various forms, such as unwoven fabrics, long fibers, woven fabrics or other fibers, particles, films, rods, boards and the like.

A thermoplastic resin is preferably capable of reacting with a radical formed by devulcanization of a vulcanized rubber. With this capability, a chemical bond is formed at the interface between the reclaimed rubber and the thermoplastic resin, which allows a rubber composite having satisfactory physical properties to be obtained.

A thermoplastic resin described above may, for example, be polyethylene resins (PE), polyamide resins, polyester resins, polyacrylonitrile resins, thermoplastic polyurethane resins, polypropylene (hereinafter referred to as PP) resins, polystyrene-based resins, acrylonitrile-styrene-based resins, polycarbonates, polyacetal resins and the like, which may be employed alone or in combination with one or more members.

Especially, the toughness of a hard thermoplastic resin can be improved by means of blending the thermoplastic resin with a reclaimed rubber, or blending the thermoplastic resin as reclaiming the vulcanized rubber. Such a hard thermoplastic resin is utilized widely, and enables an efficient utilization of a vulcanized rubber waste.

The ratio of a reclaimed rubber to a thermoplastic resin is not particularly limited, but when a large amount of the thermoplastic resin is added, the reclaimed rubber-modifying effect is enhanced. When a reclaimed rubber composite is improved actively, then a thermoplastic resin in a large amount may be added.

The weight ratio of a thermoplastic resin to a vulcanized rubber (thermoplastic resin/vulcanized rubber) is preferably within a range from 5/95 to 95/5. When the thermoplastic resin is present in an amount less than 5 or when the vulcanized rubber is present in an amount exceeding 95, the properties become identical to those of a single vulcanized rubber with no added thermoplastic resin, with which no modifying effect can be expected. Also when the thermoplastic resin is present in an amount exceeding 95 or when the vulcanized rubber is present in an amount less than 5, the properties become identical to those of a single thermoplastic resin with no added vulcanized rubber, with which no modifying effect can be expected which is not suitable for achieving the efficient utilization of a wasted rubber.

More preferably, the thermoplastic resin/vulcanized rubber ratio is 10/90 to 90/10. With such a ratio, a rubber composite exhibiting a higher modifying effect can be obtained.

(9) Addition of Carbon Black

A rubber composition according to the present invention comprises a reclaimed rubber to which carbon black is added and a thermoplastic resin where the reclaimed rubber is dispersed, wherein rubber molecules in the reclaimed rubber preferably forms a carbon gel together with the carbon black.

The carbon black contained in the vulcanized rubber binds to a rubber molecule in a reclaimed rubber by reclamation of the vulcanized rubber, and form the carbon gel. Thus, most of the carbon black remains in the reclaimed rubber and hardly migrates into a thermoplastic resin phase. Accordingly, the carbon black becomes to be dispersed only in the reclaimed rubber. Therefore, the mechanical strength and the surface quality of the entire rubber composite can be improved.

When a carbon black and a non-crosslinked rubber particle instead of a reclaimed rubber are dispersed in a thermoplastic resin phase, the carbon black migrates readily into the thermoplastic resin phase. When an excessive amount of the carbon black migrates into the thermoplastic resin phase, the surface quality of a rubber composite and the mechanical properties become poorer.

A reclaimed rubber is generally a rubber reclaimed by devulcanization and reclamation in the presence of a thermoplastic resin and a carbon black. By this process, a rubber molecule of the reclaimed rubber being bound to a carbon black forms a large amount of a toluene-insoluble carbon gel.

A carbon gel means a gel consisting of a rubber molecule and a carbon black. The carbon gel referred here includes a gel in which a three-dimensional structure is formed by a crosslinking reaction between a rubber molecule and a carbon black and a gel formed by the adsorption of a rubber molecule onto a carbon black.

It is preferable that 90% or more of the carbon black added to the reclaimed rubber forms a carbon gel. In the case of less than 90%, the above advantages led by the addition of the carbon black may not be effectively given.

The ratio of the carbon black is preferably within 5 to 60% by weight in the reclaimed rubber including the carbon a black. When the amount of carbon black is less than 5% by weight, a formed amount of the carbon gel is too small. When the amount of the carbon black exceeds 60% by weight, the formed amount of the carbon gel is excessive, leading to a degraded a moldability of the rubber composition.

(10) Properties of Reclaimed Rubber Composite

In the producing method according to the present invention, a rubber composition such as a reclaimed rubber composite can be obtained. The reclaimed rubber composite includes a reclaimed rubber, a thermoplastic resin or/and a virgin rubber. The thermoplastic resin or/and the virgin rubber are tightly bound at a radical active point of the reclaimed rubber. Either of the thermoplastic resin or/and the virgin rubber may form a matrix.

When a reclaimed rubber forms a matrix, a thermoplastic resin or/and a virgin rubber is micro-dispersed therein. This reclaimed rubber composite may be used as a rubber material as it is. It is also employed preferably as a re-vulcanized rubber composite by re-vulcanization in the presence of a vulcanizing agent. In such a case, a molded article having stable properties can be obtained.

In this rubber composition such as a reclaimed rubber composite, it is preferable that a microparticle of the thermoplastic resin or/and the virgin rubber is micro-dispersed with an average diameter being 100 $\mu$m or less. A diameter exceeding 100 $\mu$m may cause the deterioration of the surface quality and the physical properties of a molded article.

More preferably, the maximum diameter of the microparticle is 100 $\mu$m or less, and the average particle size is 10 $\mu$m or less. Departing from this range, the particles larger than 100 $\mu$m are present in a higher ratio, an adverse effect corresponding to the ratio may be observed on the surface quality and the physical properties of a molded article.

On the other hand, when a thermoplastic resin forms a matrix, a molded article having stable properties can be obtained if a reclaimed rubber composite is used as a rubber-containing thermoplastic material as it is. A vulcanizing agent may also be added to a reclaimed rubber composite to vulcanize a rubber dispersion phase to obtain a re-vulcanized rubber composite.

A rubber composition according to the present invention may contain fillers such as glass fibers, thermoplastic resin fibers, clay minerals and the like, in addition to the blends described above.

Further, a rubber composition according to the present invention may be subjected to vulcanization to form a rubber molded article, which can then be used.

(11) Production of Rubber Composition (11-i) Application of Heat and Shear Stress to Vulcanized Rubber A reclaimed rubber can be obtained by subjecting a vulcanized rubber to a reclaiming process in which a heat and a shear stress are applied thereto.

It is preferable to heat the vulcanized rubber at a temperature enabling the cutting of the crosslinking points in a vulcanized rubber but causing no preceding cutting of the main chain of the rubber molecule. Since when a greater shear stress is applied the cutting of the crosslinking points occurs more readily, reclaiming at a lower temperature is capable.

Typically, the heating is conducted preferably at a temperature within a range from 180° C. to 350° C. A temperature lower than 180° C. may cause an incomplete cutting of the crosslinking points. A temperature exceeding 350° C. may cause the cutting proceeding excessively as far as the cutting of the main chain, which may lead to the deterioration in the physical properties of the reclaimed rubber.

A temperature within a range from 180° C. to 250° C. is most preferable for sulfur vulcanized natural rubbers. A temperature within a range from 280° C. to 330° C. is most preferable for sulfur vulcanized EPDM.

The shear stress described above is preferably 10 to 150 kg/cm$^2$. A stress less than 10 kg/cm$^2$ is too small and may cause incomplete promotion of the cutting at the crosslinking points, resulting in a reduced reclamation efficiency. On the other hand, a stress exceeding 150 kg/cm$^2$ may cause not only the cutting of the crosslinking points but also the cutting proceeding excessively as far as the cutting of the main chain, which may lead to deterioration in the physical properties of the reclaimed rubber.

While the optimum range of the shear stress may also vary depending on the types of vulcanized rubbers, it is preferably from 10 to 50 kg/cm$^2$ when using a combination of a natural rubber with a styrene-butadiene rubber and a combination of a natural rubber with a styrene-butadiene rubber and a butadiene rubber.

A device for exerting a shear stress may be a twin screw extruder and the like.

The magnitude of the shear stress can be calculated from the product of the shear speed at which the device for exerting the shear stress is operated and the viscosity of the rubber at that operation.

While in the reclamation process described above is performed by exerting a heat and a shear stress simultaneously, in this context, the term "simultaneously" means to include the simultaneous exertion of the heat and the shear stress, as a matter of course, and also include an exertion of the shear stress during the period in which the temperature of the rubber is still in an appropriate range after completion of the heating, as well as an alternating exertion of the heat and the shear stress.

(11-ii) Method for Producing Rubber Composition wherein Carbon Black with Reclaimed Rubber form Carbon Gel An example of the method for producing a rubber composition in which a carbon black with a reclaimed rubber forms a carbon gel is a method in which a vulcanized rubber containing a carbon black, such as a rubber waste, is heated in the state of coexistence with a thermoplastic resin under a shear stress.

This method for production utilizes the reclamation process comprising the devulcanization of a vulcanized rubber, and can reclaim a rubber by cutting the crosslinking points between the rubber molecules preferentially by placing the vulcanized rubber under a heat and a shear stress.

The carbon black in a vulcanized rubber binds to the rubber by a chemical bond or/and a physical adsorption to form a carbon gel. This carbon gel can keep its structure even under the condition for reclaiming the vulcanized rubber since the rubber binds tightly to the carbon black. This carbon gel is integrated with a rubber polymer gel to form a solvent-insoluble gel phase as an entire structure of the carbon gel.

Since a carbon black contained in a gelled rubber has a higher affinity with a reclaimed rubber when compared with a thermoplastic resin, it hardly migrates into the thermoplastic resin. Accordingly, most of the carbon black still remains in the reclaimed rubber and an reclaimed rubber disperses finely throughout the thermoplastic resin, whereby achieving a novel rubber composite according to the present invention, which has not previously been formed. In addition, a radical is formed as a result of the cutting of the crosslinkings of the vulcanized rubber. This radical promotes the formation of a chemical bond between the thermoplastic resin and the reclaimed rubber, whereby achieving the composite formation. Accordingly, a reclaimed rubber composition having the properties which can not be achieved with a conventional reclaimed rubber can be obtained and a high value addition to a reclaimed rubber composition can thus be achieved.

The material properties of a rubber composite can be controlled by selecting the degree of the reclamation of a rubber appropriately.

Since in the present invention the composite formation is performed with cutting the crosslinking points of a vulcanized rubber, no migration of a carbon black to a thermoplastic resin occurs.

On the other hand, mixing of the thermoplastic resin, a carbon black and the raw rubber during vulcanization allows the composite formation to be proceeded simultaneously with crosslinking formation, resulting in difficulty in prevention of the migration of the carbon black into a thermoplastic resin, which leads to reduction in the physical properties of the rubber composite formation.

(11-iii) State of Coexistence of Vulcanized Rubber and Thermoplastic Resin

In a method for production according to the present invention, it is preferable to heat a vulcanized rubber as being coexisting with a thermoplastic resin at a temperature not lower than the melting point of the thermoplastic resin and also not lower than the devulcanization temperature of the vulcanized rubber with simultaneous exertion of a shear stress.

In this manner, a vulcanized rubber is devulcanized to form a reclaimed rubber, which together with a thermoplastic resin forms a rubber composition of the rubber and the thermoplastic resin.

Thus, by subjecting a vulcanized rubber as being coexisting with a thermoplastic resin to a heat at a temperature not lower than the melting point of the thermoplastic resin and also not lower than the devulcanization temperature of the vulcanized rubber and also to a shear stress, the thermoplastic resin is melt and an adequate kneading of the devulcanized reclaimed rubber with the thermoplastic resin can be achieved. As a result, a dispersion phase can finely be dispersed throughout a matrix phase.

For example, when a dispersion phase is a thermoplastic resin and a matrix phase is a reclaimed rubber, the thermoplastic resin can be micro-dispersed as a microparticle in the reclaimed rubber.

In addition, when a thermoplastic resin in the form of a fiber and the like is used, an aggregation of the fiber can be suppressed and deterioration of the rubber property of a rubber composition such as a reclaimed rubber composite can be prevented. Furthermore, since the thermoplastic resin acts as a filler, the properties, such as abrasion resistance, of the rubber composition are improved.

Also by applying a heat and a shear stress to a vulcanized rubber in the presence of a coexisting thermoplastic resin, the devulcanization reaction of the vulcanized rubber and the admixing of the thermoplastic resin can simultaneously be effected. Upon this devulcanization, the dispersion phase consisting of the thermoplastic resin or the devulcanized rubber is dispersed finely in a matrix while the crosslinkings of the vulcanized rubber such as sulfur crosslinkings are cleaved to generate a large amount of radicals. By means of these radicals, the reclaimed rubber and the thermoplastic resin undergo a chemical binding to form a composite of the both. Accordingly, a rubber composition such as a reclaimed rubber composite having the properties which can not be achieved with a conventional reclaimed rubber can be obtained and a high value addition to the rubber composition can thus be achieved.

The reclamation of a vulcanized rubber conducted in the presence of a coexisting a thermoplastic resin also allows the reclamation and the making a resin composite in the vulcanized rubber to be performed simultaneously, resulting in a reduced number of the production steps.

In the present invention, the state of the coexistence of a vulcanized rubber and a thermoplastic resin means a state in which the vulcanized rubber and the thermoplastic resin present as being coexisting with each other are subjected to a heat not lower than the melting point of the thermoplastic resin and not lower than the devulcanization temperature of the vulcanized rubber under a shear stress. Such a coexistence state includes a case in which a thermoplastic resin is added during the course of the reclamation of a vulcanized rubber and also, to the contrary, a case in which a vulcanized rubber is added to a thermoplastic resin as being melted. Especially preferable is a case in which a thermoplastic resin is added during the course of the reclamation of a vulcanized rubber. This is because reclamation of the vulcanized rubber and blending of the reclaimed rubber and the thermoplastic resin can be effected efficiently.

The temperature at which a vulcanized rubber and a thermoplastic resin are heated is preferably not lower than the melting point of the thermoplastic resin and also not lower than the devulcanization temperature of the vulcanized rubber.

The term "melting point of the thermoplastic resin" means the temperature at which the thermoplastic resin is melted and exhibits fluidity.

The term "devulcanization temperature of the vulcanized rubber" means the temperature at which the crosslinkings in the vulcanized rubber, such as of sulfurs, are cleaved.

On the other hand, the upper limit of the heating temperature is preferably a temperature at which the cutting of the main chain of a vulcanized rubber does not precedes the cutting of other parts. This is because of that when the cutting of the main chain precedes the cutting of the crosslinkings of a vulcanized rubber, some types of the rubbers undergo the formation of low molecular components, which may cause the deterioration of the mechanical properties, or which may cause an inter- or intra-molecule reaction of the rubber whereby allowing the rubber to be hardened and the rubber properties to be lost.

In addition, a lower temperature reclamation is possible under a higher shear stress, since the heat stability of the crosslinkings is reduced by means of the shear stress given to the vulcanized rubber and the thermoplastic resin.

Typically, the heating temperature described above is preferably 180° C. to 350° C. A temperature below 180° C. may cause a insufficient cutting of the crosslinking point, resulting in an incomplete reclamation of a rubber, and a temperature exceeding 350° C. may cause the cutting of the main chain of a rubber molecule which may lead to increase in the tackiness of a reclaimed rubber composite, resulting in deteriorated physical properties.

It is a matter of course that the optimum temperature range varies depending on the types of vulcanized rubber to be used for producing a composite. For example, the heating temperature is preferably 180° C. to 250° C. when the vulcanized rubber consists of a natural rubber and a styrene-butadiene rubber or of a natural rubber, a styrene-butadiene rubber and a butadiene rubber, and the like. The heating temperature described above is preferably about 180° C. when a PP(polypropylene) resin is used as a thermoplastic resin and about 230° C. when 6-nylon is used. At these temperatures, the reclamation of a rubber can be completed, and no tackiness is developed. When the vulcanized rubber is a sulfur vulcanized rubber, the heating temperature is preferably 180° C. to 250° C. and when it is a sulfur vulcanized EPDM, the temperature is 280° C. to 330° C.

The shear stress described above is preferably 10 to 150 kg/cm$^2$. A stress less than 10 kg/cm$^2$ is too small and may cause incomplete promotion of the cutting at the crosslinking points, resulting in a reduced reclamation efficiency. On the other hand, a stress exceeding 150 kg/cm$^2$ may cause not only the cutting of the crosslinking points but also the cutting proceeding excessively as far as the cutting of the main chain, which may lead to deterioration in the physical properties of the reclaimed rubber.

While the optimum range of the shear stress may also vary depending on the types of vulcanized rubbers, it is preferably from 10 to 50 kg/cm$^2$ when using a combination of a natural rubber with a styrene-butadiene rubber and a combination of a natural rubber with a styrene-butadiene rubber and a butadiene rubber.

(11-iv) Incorporation of Additives

When exerting a heat and a shear stress, various additives may be added to a vulcanized rubber and a thermoplastic resin. Such additives are, for example, reclaiming agents, reactive compatibilizer, vulcanizing agent, fillers, antioxidants, UV absorbers, reclaiming oils, peptizer and the like. Among them, the reclaiming agents, the reactive compatibilizer and the vulcanizing agents are detailed below.

A reclaiming agent is a substance which cleaves the crosslinkings of a vulcanized rubber whereby effecting devulcanization. In the present invention, addition of a reclaiming agent is not essential. Nevertheless, the devulcanization with heating under a shear stress according to the present invention can readily be proceeded when a devulcanization is added. Such a reclaiming agent includes diphenyl disulfide, phenylhydrazine-iron chloride, peroxides and the like.

A reactive compatibilizer is a reagent used for improving the compatibility between a thermoplastic resin and a reclaimed rubber. By means of addition of a reactive compatibilizer as an additive described above, the compatibility between a vulcanized rubber and a thermoplastic resin can be imparted efficiently.

A reactive compatibilizer is not particularly limited as long as it is capable of reacting a radical formed upon reclamation of a vulcanized rubber. The reactive compatibilizer is usually a monomer or an oligomer having a molecular weight of 10,000 or less. A compound having an active group capable of reacting or a group capable of imparting properties such as wettability and adhesioness is preferable. Examples are maleic anhydride, oleylamine, oleylalcohol and other olefins, as well as glycidyl methacrylate, terminal vinyl group-modified liquid butadiene rubber oligomers and the like.

Although two or more reactive compatibilizers may be combined for use, a single substance is preferable for the purpose of obtaining a rubber composite having stable properties.

It is preferable to add a reactive compatibilizer in a manner that it coexists with a radical of a devulcanized rubber formed upon reclamation. Such a manner of the addition may be a dry-blending before reclamation or an intermediate addition during the course of reclamation and the like.

The amount of a reactive compatibilizer to be added is preferably 0.01 to 20% by weight. An amount less than 0.01% by weight may lead to the absence of promoting effect on compatibility imparting. On the other hand, an amount exceeding 20% by weight is excessively large, and the excessive addition provides no additional promoting effect, and it even makes matters worse because of the unreacted reactive compatibilizer remaining in a large amount which may affect the rubber property adversely.

More preferably, the amount of a reactive compatibilizer to be added is 0.1 to 5% by weight.

The rubber composition of the present invention may be used either with or without re-vulcanization by addition of a vulcanizing agent.

A vulcanizing agent serves to crosslink the radicals with each other or the crosslinkable points in a devulcanized rubber efficiently. By adding a vulcanized agent during the process for producing a rubber composite, the surface quality and the physical properties of a rubber composite are improved. In addition, a dynamic vulcanization allows a thermoplastic resin to be a matrix phase even when the ratio of the thermoplastic resin is small.

Re-vulcanization by addition of a vulcanizing agent is preferably performed, after mixing of a vulcanized rubber and a thermoplastic resin and devulcanization of the vulcanized rubber, to proceed the vulcanizing reaction. When the re-vulcanization is performed in the presence of a vulcanizing agent before the mixing and the devulcanization, the rubber is not dispersed finely and the surface quality and the properties of a rubber composite may be deteriorated.

A method for vulcanization by means of addition of a vulcanizing agent includes a vulcanization performed in the manner of that a vulcanizing agent which vulcanizes at a higher temperature than a devulcanizing temperature is previously added to a vulcanized rubber and a thermoplastic resin, followed by raising its temperature to its vulcanizing temperature after reclamation and blending; or an intermediate addition of a vulcanizing agent during reclaiming or blending.

It is especially preferable to add a vulcanizing agent during reclamation or during blending. By this manner of addition, the vulcanizing agent is added under a shear stress, and a reclaimed rubber is re-vulcanized by means of a dynamic vulcanization, and a rubber composition capable of being molded by injection can be obtained.

Further, it is also preferable to add a vulcanizing agent to a prepared reclaimed rubber composite, followed by re-vulcanization by roll milling, re-extrusion or the like.

(11-v) Molding

Examples of the method for molding a rubber composition are injection molding, extrusion molding and press molding. Upon molding, additives and fillers usually employed in a rubber composition may be added if necessary. The rubber composition may also be added to a fresh material.

A rubber composition is capable of providing a molded article having stable properties even when molded as it is. A reclaimed rubber composite may also be supplemented with a vulcanizing agent to re-vulcanize a rubber molecule. Further, a reclaimed article consisting of 100% of the reclaimed rubber composite obtained by the producing method of the present invention can be obtained.

A rubber composite according to the present invention may widely be applied similarly to ordinary rubbers and thermoplastic resins. It can be employed in automobile interior and exterior rubber parts such as a tread of a tire, hoses, packings, belts, weather strips and the like. It can also be employed in automobile interior and exterior resin parts, as well as resin parts of hoses, cases, covers, tubes, boards and rods as structural materials, to which the application is not limited.

EMBODIMENTS

Embodiment 1

(Example 1)

A rubber composition according to this embodiment is a rubber composition consisting of a blend containing a reclaimed rubber obtained by reclamation of a vulcanized rubber by a treatment with a heat and a shear stress and a virgin rubber, and the reclaimed rubber described above still contains 40% by weight or more of a toluene-insoluble gel component and the network chain density of the rubber in the gel component is 1/20 to 1/4 based on the network chain density of the vulcanized rubber.

The vulcanized rubber according to the present embodiment is a waste tire, which is a blend rubber comprising a natural rubber (NR) and a styrene-butadiene rubber (SBR). The weight ratio in the mixture of the both components is NR/SBR=7/3.

A method for obtaining a reclaimed rubber described above is detailed below.

A tread of a waste tire was pulverized into 10 mm pellets or smaller. Subsequently, the pellets were introduced into a twin screw extruder whose screw diameter was 30 mm and whose screw length was 1200 mm, in which the reclamation was conducted at 200° C. under the shear stress of 30 kg/cm$^2$. As a result, a reclaimed rubber was obtained. The amount of the residue after extracting the reclaimed rubber with toluene was 60% by weight. A network chain density of the rubber in the gel component was 1/10 based on that of the vulcanized rubber before reclamation.

This reclaimed rubber was added to a virgin rubber which was a blend rubber of a NR and a SBR (weight ratio: 7/3) and the mixture was kneaded to obtain a rubber composition according to the present invention. In this rubber composition, the weight ratio between the reclaimed rubber and the virgin rubber was 1/2.

The performance of the rubber composition in this embodiment is described with reference to Samples 1 to 7 and Table 1. Sample 1 was a rubber composition consisting of the reclaimed rubber and the virgin rubber. Sample 2 and Sample 3 were rubber compositions made using the materials and the methods similar to those employed for Sample 1, except for performing the reclamation of the vulcanized rubbers at the temperatures of 150° C. and 300° C. for Sample 2 and Sample 3, respectively.

Sample 7 is a rubber composition obtained in the manner similar to that for Sample 1, except for an added amount of the reclaimed rubber different from that for Sample 1.

Sample 4 is a rubber composition consisting only of a virgin rubber, and Sample 5 is a rubber composition obtained by adding a vulcanized rubber coarse pellet instead of a reclaimed rubber to a virgin rubber, and Sample 6 is a rubber composition obtained by adding a reclaimed rubber obtained by PAN method to a virgin rubber.

In PAN method described above, a reclaiming agent is added to the coarse pellet of the vulcanized rubber, and the mixture was heated for example at 200° C. under the pressure of 14.5 kg/cm$^2$ for 5 hours in an autoclave, and then refined using a finishing roll and the like.

Subsequently, the gel component content, the network chain density and the residual vinyl group in each reclaimed rubber which had been added to obtain the rubber composition of each of Samples 1 to 4, 6 and 7 were determined.

For determining the % gel content of the reclaimed rubber, 0.1 g of a test piece of the reclaimed rubber (Piece A) was weighed accurately and immersed in toluene in the amount larger by 100 times (weight) of the test piece for 48 hours to achieve swelling.

The swollen reclaimed rubber test piece (Piece B) was taken and the excessive toluene present on the surface was wiped off, and then placed in a container which was able to be closed tightly, and then weighed. The swollen reclaimed rubber test piece (Piece B) was taken from the container and dried in vacuo for 12 hours to remove toluene. The test piece thus dried (Piece C) was then weighed.

From the determination conducted as described above, (gel content)=(weight of test piece after swelling followed by drying [Piece C])/(Weight of test piece [Piece A]) was calculated. The results are shown in the column of the gel content.

The network chain density of the reclaimed rubber was calculated from the weight of a test piece after swelling followed by drying [Piece C] and the weight of the swollen test piece (Piece B) in accordance with Flory-Rehner equation. The results are shown in the column of the network chain density in Table 1.

The ratio of the residual vinyl group in the reclaimed rubber was determined by a solid NMR analysis. The results are shown in the column of the residual vinyl group in Table 1.

In each experiment described above, Sample 4 was evaluated using a test piece made from a non-vulcanized virgin rubber which formed Sample 4.

The rubber compositions of Samples 1 to 7 were vulcanized to obtain vulcanized rubber molded articles.

In this process, 3 parts by weight of sulfur, 5 parts by weight of zinc oxide, 1 part by weight of stearic acid and 1 part by weight of a vulcanization accelerator (N Cyclohexyl-2-benzothiazolyl-sulfenamide) CBS were added to 100 parts by weight of each rubber composition, as shown in Table 1, and then the above obtained was vulcanized at 141° C. for 20 minutes.

The vulcanized rubber molded article thus obtained was examined for its physical properties in accordance with JISK6301. The strength and the extension determined are shown in Table 1. The vulcanized rubber molded article was also subjected to Lambourn abrasion test to determine the abrasion resistance, which is shown also in Table 1.

As evident from Table 1, Sample 2 had too high a network chain density in the reclaimed rubber, while Sample 3 had a network chain density and a gel component content both of which were to low. As a result, any of these samples exhibited a strength, an extension and an abrasion resistance all of which were poorer when compared with Sample 4 made only from a virgin rubber.

Sample 5 also exhibited a strength, an extension and an abrasion resistance all of which were poorer when comparing with Sample 4, since it was a blend of a simple rubber powder.

Sample 6 gave a reclaimed rubber whose residual vinyl group was too low since it was made using PAN method as a process for reclaiming the vulcanized rubber, resulting in a strength, an extension and an abrasion resistance all of which were poorer.

On the contrary, the vulcanized rubber molded articles obtained from Sample 1 and Sample 7 according to the present invention exhibited the performances almost equivalent to that of the vulcanized rubber molded article obtained from Sample 4 which was made only from a virgin rubber.

The advantageous effects of the present invention are detailed below,

A rubber composition according to the present invention contains a reclaimed rubber.

In this reclaimed rubber, 40% by weight or more of a toluene-insoluble gel component in a vulcanized rubber is contained residually.

The network chain density of the rubber in the gel component is 1/20 to 1/4 based on that of the vulcanized rubber. This means that the rubber molecule maintains a crosslinking structure.

Such a reclaimed rubber has a fluidity and a compatibility with a virgin rubber and can be dispersed finely throughout the virgin rubber. Accordingly, the reclaimed rubber described above binds readily with the virgin rubber, resulting in a high rubber property of a rubber composition containing the blend of the both (See Table 1).

In addition, since in a rubber composition a according to the present invention a certain amount of a reclaimed rubber is added to a virgin rubber, the corresponding amount of the virgin rubber can be saved. As a result, the recycling of a used rubber product can be promoted.

(Example 2)

A rubber composition was produced in the similar manner to that in Sample 1 in Example 1, except that the weight ratio between the reclaimed rubber and the virgin rubber was set to 1/4.

A tire for an automobile using this rubber composition for a tread thereof was produced (tire 1).

As comparatives, a tire merely formed of a virgin rubber (tire 2) and a tire in which a rubber composition formed by adding a reclaimed rubber obtained by PAN method to the virgin rubber was used for a tread thereof (tire 3) were produced.

These tires were examined for the abrasion resistance. As a result, the tire 1 exhibited similar abrasion resistance to that of the tire 2 and was able to be used similarly to a tire only formed of the virgin rubber. On the other hand, the tire 3 showed quite a lower abrasion resistance compared to the tire 2, and could not be employed as a tire in practical use.

(Example 3)

In this example, a disposed material of a weather strip formed of a sulfur-vulcanized EPDM was used as a vulcanized rubber. The disposed material of the weather strip was pulverized into 10 mm or less. Then, the pulverized material was introduced into a twin screw extruder whose screw diameter was 30 mm and whose screw length was 1200 mm, in which the reclamation was conducted at 300° C. under the shear stress of 30 kg/cm$^2$. As a result, a reclaimed rubber was obtained.

The amount of the residue after extracting the reclaimed rubber with toluene was 50% by weight. A network chain density of the rubber in the gel component was 1/10 based on that of the vulcanized rubber before reclamation.

This reclaimed rubber was added to EPDM which was a virgin rubber to obtain a rubber composition according to the present invention. In this rubber composition, the weight ratio between the reclaimed rubber and the virgin rubber was 1/4.

Then 1.5 parts by weight of sulfur, 5 parts by weight of zinc oxide, 1 part by weight of stearic acid, 2 parts by weight of NOCCELER TT (tetramethylthiuramdisulfide) and 0.5 parts by weight of NOCCELER M (2-mercaptobenzothiazole) were added to 100 parts by weight of the above rubber composition and extrusion-vulcanizing was subsequently conducted to obtain a weather strip for an automobile (weather strip 1).

As comparatives, a weather strip only formed of a virgin rubber (weather strip 2) and a weather strip in which a rubber composition formed by adding a reclaimed rubber obtained by PAN method to the virgin rubber was used (weather strip 3) were produced.

The weather strip 1 exhibited a moldability, mechanical properties and a surface quality which were similar to those of the weather strip 2, and was able to be used similarly to a weather strip only formed of the virgin rubber. On the other hand, the weather strip 3 showed a deteriorated surface quality and could not be employed in practical use.

capacity was 5 kg/h, and the ratio between the vulcanized EPDM rubber piece and the PP resin(the vulcanized EPDM rubber piece/the PP resin) was 30 parts by weight/70 parts by weight.

Subsequently, the pellet consisting of the rubber composite obtained by the extrusion process was inserted into an injection molding machine, with which the injection molding was effected at 200° C. to obtain a molded article made from the rubber composite.

Figure 1:
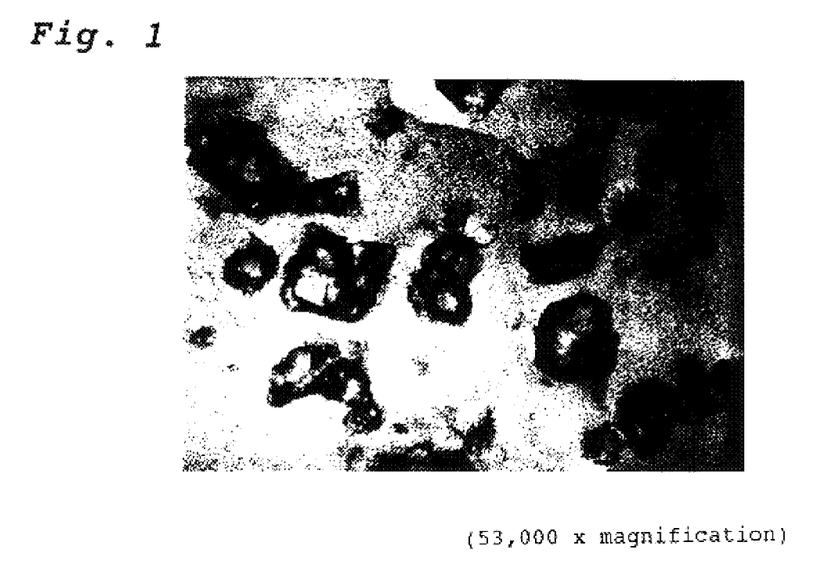
FIG. 1 is a microscopic photograph (×53,000) showing a rubber composite structure of Example 1 of Embodiment 2.

The molded article thus obtained was observed using a transmission electron microscope (TEM). A microscopic photograph was shown in FIG. 1. In FIG. 1, a black particle is the reclaimed rubber of the EPDM rubber, while a white area is a matrix of PP.

Figure 2:
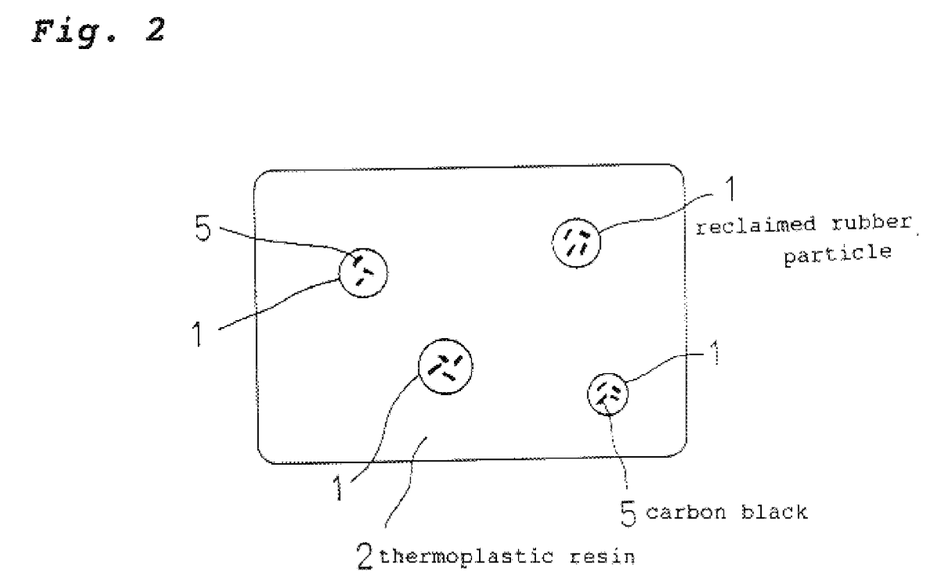
FIG. 2 is a schematic view of a rubber composite of Example 1 of Embodiment 2.

Observation of this photograph revealed that particles of a reclaimed rubber 1 of the EPDM rubber were dispersed in a thermoplastic resin 2 of the PP resin, as illustrated schematically in FIG. 2. Most of a carbon black 5 was present in the particles of the reclaimed rubber 1.

The physical properties of the molded article obtained as above were then determined. As a result, the tensile strength was 21 MPa, the elongation at break was 400% and the Izod impact was 320 J/m, as shown in Table 2. These excellent properties may be attributable to the carbon gel formed by

TABLE 1

|  | Sample 1 Reclaimed rubber | Sample 2 Reclaimed rubber | Sample 3 Reclaimed rubber | Sample 4 No addition | Sample 5 Rubber powder | Sample 6 PAN method | Sample 7 Reclaimed rubber |
| --- | --- | --- | --- | --- | --- | --- | --- |
| Gel fraction (%) | 50 | 70 | 30 | — | — | 60 | 50 |
| Network chain density* | 1/10 | 1/2 | 1/30 | 1 | — | 1/6 | 1/10 |
| Residual vinyl group* | 0.8 | 0.9 | 0.2 | 1 | — | 0.3 | 0.8 |
| Added amount of reclaimed rubber (parts by weight) | 50 | 50 | 50 | 0 | 50** | 50 | 10 |
| Sulfur | 3 | 3 | 3 | 3 | 3 | 3 | 3 |
| Zinc oxide | 5 | 5 | 5 | 5 | 5 | 5 | 5 |
| Stearic acid | 1 | 1 | 1 | 1 | 1 | 1 | 1 |
| Vulcanization accelerator CBS | 1 | 1 | 1 | 1 | 1 | 1 | 1 |
| Dispersion state | 100 µm or less | 500 µm or more | 100 µm or less | — | 500 µm or more | 100 µm or less | 100 µm or less |
| Tensile strength (MPa) | 18 | 10 | 12 | 20 | 9 | 13 | 19.5 |
| Elongation at break (%) | 400 | 220 | 280 | 500 | 120 | 230 | 490 |
| Abrasion resistance* | 0.95 | 0.8 | 0.65 | 1 | 0.6 | 0.7 | 1 |

*The value of Sample 4 is set to be a standard
**The added amount of the rubber powder Embodiment 2

A rubber composition according to this embodiment comprises a reclaimed rubber dispersed in a thermoplastic resin. A rubber molecule in the reclaimed rubber forms a carbon black and a carbon gel.

An example according to this embodiment is detailed with reference to a comparative.

(Example 1)

A sulfur-crosslinked EPDM rubber scrap containing 50% by weight of a carbon black was employed as a vulcanized rubber and pulverized into about 10 mm square pieces, which were employed as samples for reclamation. As a thermoplastic resin, a pellet of a PP resin was employed.

The vulcanized rubber piece was inserted into a twin screw extruder, in which reclamation was performed at 300° C. Halfway in this process, the PP resin was added using a side-feeder, whereby effecting the reclamation of the vulcanized rubber simultaneously with melt-kneading. After addition of the PP resin, the kneading temperature was lowered to 230° C. The screw speed was 400 rpm, and the output means of the binding between the EPDM rubber and the carbon black, which did not migrate into the PP resin phase during kneading, resulting in prevention of the deterioration of the physical properties and also resulting in an increase in the compatibility between the PP resin and the EPDM rubber by a formation of a radical upon devulcanization, which leaded to an improvement also in the mechanical properties.

A rubber composite according to the present invention exhibited the properties which have not been achieved in the molded article made simply from a single PP resin as in Comparative 1 described below, and thus can widely be utilized.

(Comparative 1)

Without addition of an EPDM rubber or a carbon black, a single PP resin was subjected to the melt-kneading process at 230° C. Then the injection molding was performed at 200° C. Otherwise, the manner similar to that in Example 1 was employed to obtain a molded article made from a single PP resin. The molded article thus obtained was examined for its physical properties, and as a result, as shown in Table 2, the elongation at break and the impact strength were lower than those of Example 1.

(Comparative 2)

An EPDM rubber containing 50% by weight of a carbon black which had not been sulfur-crosslinked. Since this non-crosslinked EPDM rubber was not crosslinked, no binding between the carbon black and the rubber were formed therein. Otherwise, the manner similar to that in Example 1 was employed to obtain a molded article. The molded article thus obtained was examined for its physical properties, and as a result, as shown in Table 2, the properties were poorer than those of Example 1. Such poor properties were possibly due to the absence of the crosslinkings in the EPDM rubber which leaded to the migration of a large amount of the carbon black contained in the rubber into the PP resin phase.

(Comparative 3)

The vulcanized rubber employed in Example 1 was pulverized as being frozen to obtain a rubber powder of the vulcanized EPDM rubber (particle size: 100 μm). This rubber powder was admixed with the PP resin during the melt-kneading process and molded by injection at 200° C. The amount of the rubber powder added was the same as in Example 1. Otherwise, the manner similar to that in Example 1 was employed to produce a molded article.

The molded article thus obtained was examined for its physical properties, and as a result, as shown in Table 2, the properties were poorer than those of Example 1. Such poor properties were possibly due to the fact that the vulcanized EPDM rubber was present merely as a foreign body which did not serve to improve the physical properties of the composite.

In each column in Table 2 and following Tables 3 to 7, the designation "-" represents no addition or no determination.

TABLE 2

| | Example 1 | Comparative 1 | Comparative 2 | (wt %) Comparative 3 |
|---|---|---|---|---|
| Reclaimed EPDM | 30 (CB50%)* | — | — | — |
| Non-vulcanized EPDM | — | — | 30(CB50%)* | — |
| Vulcanized rubber powder EPDM | — | — | — | 30 |
| PP | 70 | 100 | 70 | 70 |
| Tensile strength (MPa) | 21 | 33 | 15 | 12 |
| Elongation at break (%) | 400 | 250 | 120 | 60 |
| Izod impact (J/m) | 320 | 40 | 97 | 50 |

*CB50% 50 wt % of carbon black contained in each EPDM (Example 2)

Similarly as in Example 1, a molded article made from a rubber composite (a 200 μm thickness film) was obtained.

The % gel content and the weight swelling degree of the rubber component in this rubber composite were determined.

For determining the % gel content of the rubber component, 0.1 g of the rubber composite was weighed accurately and immersed in toluene in the amount larger by 100 times for 48 hours. The excessive toluene present on the surface was wiped off, and the composite was placed in a container which was able to be closed tightly, and then weighed. After drying in vacuum at room temperature for 24 hours, toluene was removed and the dry weight was determined. Form the values thus determined, the % gel content was calculated in accordance with equations (1) and (2) shown below. In the calculation, correction of the values by subtracting the weights of inorganic substances such as the carbon black and the weights of oils and resins from the weight of the test piece should be made. % By weight of gel content=Weight of rubber polymer after drying of swollen test piece/Weight of rubber polymer of test piece in air - - - (1) Weight swelling degree ={(Weight of rubber polymer of swollen test piece)–(Weight of rubber polymer after drying of swollen test piece)}/(Weight of rubber polymer after drying of swollen test piece) - - - (2)

As shown in Table 3, the determination revealed that the % gel content of the rubber polymer component in the molded article was 55%, and the weight swelling degree was ×3.

TABLE 3

| | Example 2 |
|---|---|
| Weight swelling degree* | 3 times |
| % gel content (gel fraction) | 55% |

*The value of the rubber before reclaiming is set to be standard (Example 3)

Similarly as in Example 1, a sulfur-crosslinked EPDM rubber scrap containing 50% by weight of a carbon black was employed as a vulcanized rubber and pulverized into about 10 mm square pieces. As a thermoplastic resin, a pellet of a PP resin was employed. The ratio between the vulcanized EPDM rubber piece and the PP resin(the vulcanized EPDM rubber piece/the PP resin) was 30 parts by weight/70 parts by weight. The PP resin was added using a side feeder similarly as in Example 1 but this time together with talc. Otherwise, the manner similar to that in Example 1 was employed to obtain a molded article.

The molded article thus obtained was examined for the physical properties. As a result, the tensile strength was 23 MPa, the elongation at break was 400% or more, the Izod impact was 300 J/m, Rockwell hardness (R scale) was 70 and the heat deformation temperature under 455 KPa was 115° C., and no electric charge was observed, as indicated in Table 4.

Observation of the molded article using an electron microscope revealed that the PP resin formed a matrix phase, and the reclaimed rubber obtained from the EPDM rubber formed a dispersion phase, exhibiting the reclaimed rubber in a size of about 5 μm. Since the molded article in this example contained a large amount of the carbon black in the reclaimed rubber, it exhibited the properties different from those of Comparative 4 shown below in which no carbon black was added.

These satisfactory results described above may be attributable to the fact that the carbon black contained in the reclaimed rubber did not migrate into the matrix phase consisting of the PP resin since it was bound to the reclaimed EPDM rubber whereby causing no deterioration of the physical properties.

(Comparative 4)

A non-vulcanized EPR (ethylene propylene rubber) and a non-vulcanized EBR (ethylene butylene rubber) were prepared. The both contained neither of vulcanizing agents nor carbon black. These non-vulcanized EPR and non-vulcanized EBR were inserted into a twin screw extruder and melt-kneaded at 230° C. Otherwise, the manner similar to that in Example3was employed to obtain a molded article.

As shown in Table 4, various physical parameters determined using the molded article revealed poorer physical properties when compared with Example 3.

TABLE 4

|  | Example 3 | (parts by weight) Comparative 4 |
|---|---|---|
| Reclaimed EPDM | 30(CB50%)* | — |
| Non-vulcanized EPR, EBR | — | 15, 15 |
| PP | 70 | 70 |
| Talc | 10 | 10 |
| Tensile strength (MPa) | 23 | 18 |
| Elongation at break (%) | 400 or more | 400 or more |
| Isod impact (J/m) | 300 | 250 |
| Rockwell hardness (R scale) | 70 | 65 |
| Heat deformation temperature (455KPa) | 115° C. | 110° C. |
| Electric charge | none | observed |
| Particle size (μm) | 5 | 5 |
| Surface quality | good | good |

*CB50% 50 wt % of carbon black contained in each EPDM

Embodiment 3

A rubber composition in this embodiment was produced by heating a vulcanized rubber in the presence of a coexisting thermoplastic resin at a temperature not lower than the melting point of the thermoplastic resin and not lower than the devulcanization temperature of the vulcanized rubber under a shear stress. The examples according to this embodiment are detailed below with reference to the comparatives.

(Example 1)

A 66 nylon fiber-reinforced hose made from an EPDM rubber (fiber content: 2% by weight) was cut into about 10 mm square pieces, which were employed as a sample for reclamation. The sample was inserted to a twin screw extruder (screw diameter: 30 mm, screw length: 1200 mm). The screw speed was 400 rpm, the processing temperature was 300° C. and the output capacity was 5 kg/h. The processing temperature 300° C. was higher than the melting point of the 66 nylon fiber (260° C.) and also higher than the devulcanization temperature of the EPDM rubber (280° C.).

By this procedure, the devulcanization of the vulcanized rubber was performed simultaneously with kneading.

Figure 3:
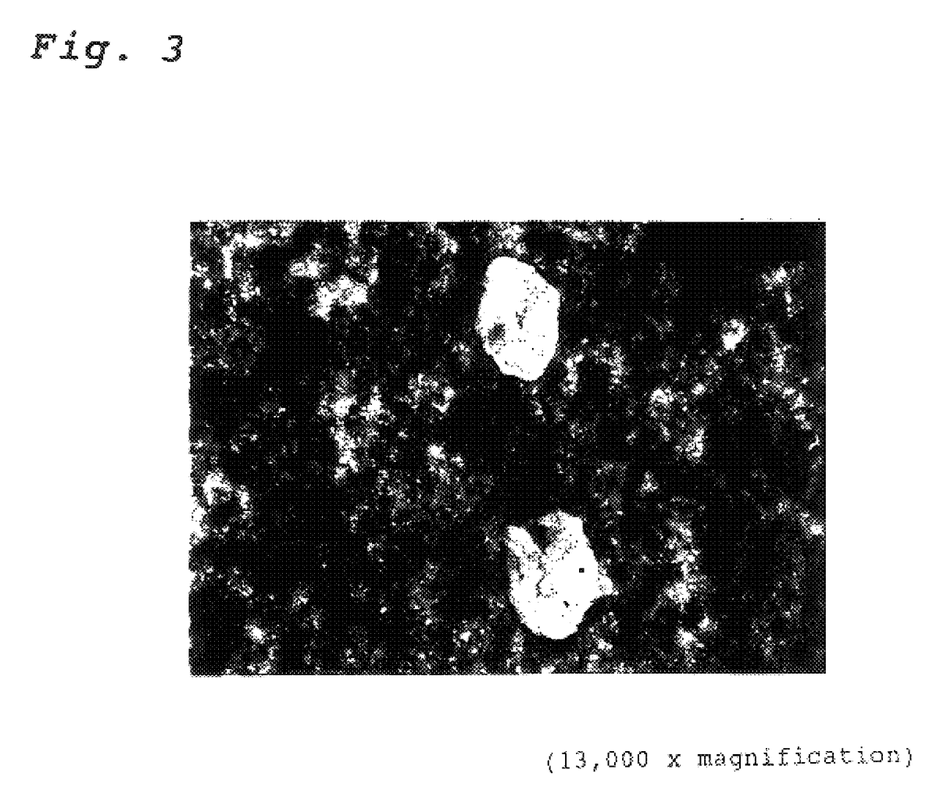
FIG. 3 is a microscopic photograph (×13,000) indicating the state of dispersion of the resin in a reclaimed rubber structure of Example 1 of Embodiment 3.

The Mooney viscosity ($ML_{1+4}$, 100° C.) of the reclaimed rubber obtained as being devulcanized was 60. Observation of the condition of the 66 nylon fiber in the reclaimed rubber using a transmission electron microscope (TEM) revealed a 1 μm or finer micro-dispersion of the 66 nylon fiber as shown in FIG. 3. In FIG. 3, a white particle is the nylon 66 fiber, while a black area is the EPDM rubber.

Then this reclaimed rubber being devulcanized was kneaded together with vulcanizing agents including 0.8 parts by weight of sulfur, 1.7 parts by weight of zinc oxide, 0.3 parts by weight of stearic acid, 0.67 parts by weight of NOCCELER TT (trade name, OUCHI SHINKO CHEMICAL INDUSTRIAL CO., LTD.) and 0.17 parts by weight of NOCCELER M (trade name, OUCHI SHINKO CHEMICAL INDUSTRIAL CO., LTD.). Subsequently, a press vulcanization was conducted for 20 minutes at 160° C. As a result, a 2 mm-thickness, 30 cm-square molded article made from a re-vulcanized rubber composite of the reclaimed rubber was obtained.

NOCCELER TT is tetramethylthiuramdisulfide, while NOCCELER M is 2-mercaptobenzothiazole.

A test piece was then cut from the molded article, and examined for the physical properties in accordance with JIS-K6301. As a result, the Mooney viscosity ($ML_{1+4}$, 100° C.) as 60, as shown in Table 5, and the fiber exhibited a 1 μm or finer dispersion. The strength of the test piece was 19.0 MPa. The elongation at break was 610%. The hardness of the test piece (in accordance with JIS-A) was 75. The surface quality was satisfactory.

(Comparative 1)

Using an EPDM rubber hose which was not reinstressd with a 66 nylon fiber, the reclamation was conducted in the condition similar to that in Example 1, and then re-vulcanization was conducted to obtain a re-vulcanized rubber composite, which was then examined for its physical properties. As a result, no difference between Comparative 1 and Example 1 in the physical properties was observed as shown in Table 5.

(Comparative 2)

Using the sample for reclamation of the 66 nylon-reinforced hose made from an EPDM rubber used in Example 1, the reclamation was performed in an autoclave. The reclamation condition in the autoclave was 200° C. under a vapor pressure of 14.5 kg/cm² over the reaction period of 5 hours. Subsequently, refinement was performed for about 5 minutes using a finishing roll.

The Mooney viscosity ($ML_{1+4}$, 100° C.) of the reclaimed rubber obtained as being devulcanized was 60. Visual observation of the condition of the 66 nylon fiber in the reclaimed rubber revealed the 66 nylon fiber remaining unmelted and engaging with each other to form an aggregation.

Subsequently, re-vulcanization was conducted in the condition similar to that in Example 1. In this manner, a molded article made from the re-vulcanized rubber composite of this example was obtained.

The physical properties of the molded article of this example were then determined. As a result, the molded article of this example exhibited a low surface quality, and low material properties. Such results may be attributable to the fact that the heating temperature during the reclamation was as low as 200° C. and no shear stress was given during the reclamation.

As mentioned above, the method in Example 1 was proven to be effective when reclaiming a rubber which was made of a composite in combination with a fiber and the like.

In each column in Table 5 and following Tables 6 to 10, the designation "-" represents no addition or no determination.

TABLE 5

|  | Example 1 | Comparative 1 | Comparative 2 |
|---|---|---|---|
| Mooney viscosity ($ML_{1+4}$, 100° C.) | 60 | 60 | 100 |
| Fiber dispersion state | 1 μm or less | — | 100 μm or more |
| Tensile strength (MPa) | 19.0 | 19.5 | 12.3 |
| Elongation at break (%) | 610 | 630 | 330 |
| Hardness (JIS-A) | 75 | 70 | 70 |
| Surface quality | good | good | bad |

(Example 2, Comparative 3 to 6)

A sulfur-crosslinked EPDM rubber scrap and a butyl rubber scrap (hereinafter referred to as IIR) were employed as a vulcanized rubber and pulverized into about 10 mm square pieces, which were employed as a sample for reclamation. As a thermoplastic resin, a pellet of a 6 PA (meaning 6 nylon, the same applies analogously to the followings) resin or a 66 PA (meaning 66 nylon, the same applies analogously to the followings) resin was employed.

A vulcanized rubber piece and a thermoplastic resin were inserted as dried into a twin screw extruder, in which reclamation was performed simultaneously with kneading. In this process, the screw speed was 400 rpm, and the output capacity was 5 kg/h, and the ratio between the vulcanized rubber piece and the thermoplastic resin (the vulcanized rubber piece/the thermoplastic resin) was 80 parts by weight/20 parts by weight. Processing temperatures and compositions were varied here.

As a result, molded articles from various reclaimed rubber composites were obtained, and designated as Example 2 and Comparatives 3 to 5. Separately, a single vulcanized EDPM rubber was reclaimed at 300° C. to obtain a reclaimed rubber, which was designated as Comparative 6.

Subsequently, these molded articles were observed visually for their conditions as extrusion products. The results are shown in Table 6.

As evident from Table 6, a strand-like extrusion product was obtained in Example 2 and exhibited a smooth surface. Observation using an electron microscope revealed a fine dispersion of the 66 PA as an about 10 $\mu$m particle in the EPDM.

On the contrary, no fine dispersion of the thermoplastic resin was observed in any of Comparatives 3 to 5. Based on these results, it was proven that a satisfactory reclaimed rubber composite can be obtained by heating a vulcanized rubber in the presence of a coexisting thermoplastic resin at a temperature not lower than the melting point of the thermoplastic resin and not lower than the devulcanization temperature under a shear stress.

In Comparative 6, a sample was obtained by a conventional ordinary rubber reclamation process using no thermoplastic resin.

MPa, the elongation at break was 630%, the hardness (in accordance with JIS-A) was 80, and the abrasion resistance was 1.3 times that of Comparative 7 described below. The surface quality was also satisfactory. These physical properties were satisfactory similarly to those of Comparative 7 described below (simple re-vulcanized rubber).

Such satisfactory physical properties may be attributable to the improved mechanical properties as a result of an increased compatibility due to a radical formed upon reclamation. The molded article in this example had the properties which have not been achieved with a simple re-vulcanized rubber such as that in Comparative 7 described below, and thus is a reclaimed material which can widely be utilized.

(Comparative 7)

Using the molded article of Comparative 6 described above which was made only from the sulfur-crosslinked EPDM rubber containing no thermoplastic resin, the re-vulcanization treatment was performed similarly as in Example 3. The amounts of the vulcanizing agents such as sulfur, zinc oxide, stearic acid, NOCCELER TT and NOCCELER M were performed similarly as in Example 3. A re-vulcanized rubber molded article was thus obtained.

The molded article obtained was examined for the physical properties, and the results shown in Table 7 were obtained.

TABLE 6

|  | Example 2 | Comparative 3 | Comparative 4 | Comparative 5 | Comparative 6 |
|---|---|---|---|---|---|
| Heating temperature | 300° C. | 230° C. | 230° C. | 200° C. | 300° C. |
| IIR | — | — | — | devulcanizing temperature or higher | — |
| EPDM | devulcanizing temperature or higher | devulcanizing temperature or lower | devulcanizing temperature or lower | — | devulcanizing temperature or higher |
| 66 PA | melting temperature or higher | melting temperature or lower | — | melting temperature or lower | — |
| 6 PA | — | — | melting temperature or higher | — | — |
| Condition of extrusion product | strand-like condition | powder-like condition | sticky threads-having condition* | rough strand-like condition | strand-like condition |

*Powder-like condition wherein the thermoplastic resin in the powder melts and has sticky threads (Example 3)

Using the condition and the method similar to those in Example 2, a blend of a reclaimed rubber and a thermoplastic resin was obtained. The blend thus obtained was roll-kneaded together with 0.8 parts by weight of sulfur, 1.7 parts by weight of zinc oxide, 0.3 parts by weight of stearic acid, 0.67 parts by weight of NOCCELER TT and 0.17 parts by weight of NOCCELER M based on 100 parts by weight of the EPDM rubber component contained therein. Subsequently, a press re-vulcanization was conducted for 20 minutes at 160° C. to obtain a 2 mm-thickness, 30 cm-square re-vulcanized rubber molded article.

The molded article thus obtained was examined for the physical properties. As a result, the tensile strength was 19.5

TABLE 7

|  | Example 3 | Comparative 7 |
|---|---|---|
| Tensile strength (MPa) | 19.5 | 20.0 |
| Elongation at break (%) | 630 | 650 |
| Hardness (JIS-A) | 80 | 70 |
| Abrasion resistance* | 130 | 100 |
| Surface quality | good | good |

*Relative value when Comparative 7 is set to 100

(Example 4)

A sulfur-crosslinked EPDM rubber scrap containing 50% by weight of a carbon black was employed as a vulcanized rubber and pulverized into about 10 mm square pieces, which were employed as a sample for reclamation. As a thermoplastic resin, a pellet of a PP resin was employed.

The vulcanized rubber piece was inserted into a twin screw extruder, in which the reclamation was performed at 300° C. Halfway in this process, the PP resin was added using a side-feeder, whereby effecting the reclamation of the vulcanized rubber simultaneously with melt-kneading. After addition of the PP resin, the kneading temperature was lowered to 230° C. The screw speed was 400 rpm, and the output capacity was 5 kg/h, and the ratio between the vulcanized EPDM rubber piece and the PP resin(the vulcanized EPDM rubber piece/the PP resin) was 30 parts by weight/70 parts by weight.

Subsequently, the pellet of the reclaimed rubber composite obtained by the extrusion process was molded by injection molding at 200° C. to obtain a molded article made from the reclaimed rubber composite.

The physical properties of the molded article thus obtained were determined. As a result, the tensile strength was 21 MPa, the elongation at break was 400% and the Izod impact was 320 J/m, as shown in Table 8. These excellent properties may be attributable to a binding between the EPDM rubber and the carbon black, which did not allow the carbon black to migrate into the PP resin phase during kneading, resulting in prevention of the deterioration of the physical properties and also resulting in an increase in the compatibility between the PP resin and the EPDM rubber by the formation of a radical upon reclamation, which leaded to an improvement also in the mechanical properties.

A reclaimed rubber composite in this example exhibited the properties which have not been achieved with a material used in a conventional vulcanized rubber reuse as described in the following Comparative 10, and thus can widely be utilized.

(Comparative 8)

Using only the PP resin employed in Example 4, a melting process was conducted at 230° C. Then the injection molding was effected at 200° C. to obtain a molded article. The physical properties of this article were determined and the results were poorer than those in Example 4, as shown in Table 8.

(Comparative 9)

A non-sulfur-crosslinked EPDM rubber (with no addition of vulcanizing agent) was prepared. This non-vulcanized EPDM rubber contained 50% by weight of a carbon black. Otherwise, the manner similar to that in Example 4 was employed to obtain a molded article.

The physical properties of this molded article were determined and the results were poorer than those in Example 4, as shown in Table 8. This may be due to the migration of a large amount of the carbon black contained in the rubber into the PP resin phase.

(Comparative 10)

A vulcanized EPDM rubber powder (particle size: 100 μm) obtained by freeze-grinding was added to a PP resin during injection molding. The amount added was 30 parts by weight to 70 parts by weight of the PP resin.

The physical properties of the molded article thus obtained were determined and the results were poorer than those in Example 4, as shown in Table 8. This may be due to the fact that the EPDM rubber was present merely as a foreign body which did not serve in any way to improve the physical properties of the composite.

TABLE 8

|  | Example 4 | Comparative 8 | Comparative 9 | (wt %) Comparative 10 |
|---|---|---|---|---|
| Reclaimed EPDM | 30 (CB50%)* | — | — | — |
| Non-vulcanized EPDM | — | — | 30(CB50%)* | — |
| Vulcanized rubber powder EPDM | — | — | — | 30 |
| PP | 70 | 100 | 70 | 70 |
| Tensile strength (MPa) | 21 | 33 | 15 | 12 |
| Elongation at break (%) | 400 | 250 | 120 | 60 |
| Izod impact (J/m) | 320 | 40 | 97 | 50 |

*CB50% 50 wt % of carbon black contained in each EPDM (Example 5)

A 6 PA was used as a thermoplastic resin. The ratio between the vulcanized EPDM rubber piece and the 6 PA resin (the vulcanized EDPM rubber piece/the 6 PA resin) was 80 parts by weight/20 parts by weight. Otherwise, the condition similar to that in Example 4 was employed to perform the reclamation and melt-kneading.

Subsequently, the kneaded material was roll-kneaded together with 0.8 parts by weight of sulfur, 1.7 parts by weight of zinc oxide, 0.3 parts by weight of stearic acid, 0.67 parts by weight of NOCCELER TT and 0.17 parts by weight of NOCCELER M based on 100 parts by weight of the EPDM rubber component contained therein, and then a press vulcanization was conducted for 20 minutes at 160° C. to obtain a 2 mm-thickness, 30 cm-square re-vulcanized rubber molded article.

The molded article thus obtained was examined for the physical properties. As a result, the tensile strength was 19 MPa, the elongation at break was 600%, the hardness (in accordance with JIS-A) was 78, as shown in Table 9. Observation of the molded article using an electron microscope revealed that the 6 PA was present as a fine particles having a size of about 10 μm in the reclaimed rubber. Such satisfactory physical properties may be due to an increased compatibility between the EPDM rubber and the 6 PA through the radical formation occurring in the EPDM upon reclamation.

Accordingly, the re-vulcanized rubber composite in this example obtained by utilizing the reclamation process of a vulcanized rubber was proven to be a useful blend material.

(Example 6)

A molded article in this example was obtained similarly as in Example 5 except that 1 part by weight of maleic anhydride was also added together with the 6 PA using a side feeder during the reclamation. Otherwise, the procedure similar to that in Example 5 was employed to obtain the molded article.

The molded article thus obtained was examined for the physical properties. As a result, the tensile strength, the elongation at break and the hardness were satisfactory similarly to those obtained in Example 5 as shown in Table 9.

In addition, the 6 PA was present as a fine particles having a size of about 1 μm in the reclaimed rubber. This may be due to maleic anhydride acting as a reactive compatibilizer which improved the compatibility between the EPDM rubber and the 6PA further to a level higher than that in Example 5. Accordingly, the re-vulcanized rubber composite in this example obtained by utilizing the reclamation process of a vulcanized rubber was proven to be a useful blend.

(Comparative 11)

80 Parts by weight of a non-vulcanized EPDM rubber (with no addition of vulcanizing agent) and 20 parts by weight of the 6 PA resin were melt-kneaded at 230° C., and vulcanized in the condition similar to that in Example 5. The amounts of the sulfur, the zinc oxide, the stearic acid, NOCCELER TT and NOCCELER M added in the vulcanization similar to those in Example 5. A molded article made from a vulcanized rubber composite was thus obtained.

The molded article obtained was examined for the physical properties. As a result, the molded article of this example exhibited the tensile strength and the elongation at break which were lower than those observed in Examples 5 or 6. Moreover, the 6 PA formed a relatively larger particles, such as that having a size of about 100 μm. The compatibility between the EPDM rubber and the 6 PA resin was poor. This may be due to the radical formation upon reclamation, the migration of the carbon black into the resin phase, the difference in the received shear stress between the reclaimed rubber and the non-vulcanized rubber, and the difference in the viscosity between the both during kneading.

TABLE 9

|  | Example 5 | Example 6 | (parts by weight) Comparative 11 |
|---|---|---|---|
| Reclaimed EPDM | 80 | 80 | — |
| Non-vulcanized EPDM | — | — | 80 |
| 6PA | 20 | 20 | 20 |
| Maleic anhydride | — | 1 | — |
| Tensile strength (MPa) | 19 | 20 | 13 |
| Elongation at break (%) | 600 | 630 | 280 |
| Hardness (JIS-A) | 78 | 77 | 80 |
| Particle size (μm) | 10 | 1 | 100 |

(Example 7)

Similarly as in Example 4, a sulfur-crosslinked EPDM rubber scrap containing 50% by weight of a carbon black was employed as a vulcanized rubber and pulverized into about 10 mm square pieces, which were employed as samples for reclamation. As a thermoplastic resin, a pellet of a PP resin was employed. The ratio between the sulfur-crosslinked EPDM rubber and the PP resin (the sulfur-crosslinked EPDM rubber/the PP resin) was 30 parts by weight/70 parts by weight. The PP resin was added using a side feeder similarly as in Example 4 but this time together with talc. The injection molding was performed at 200° C. Otherwise, the manner similar to that in Example 4 was employed to obtain a molded article.

The molded article thus obtained was examined for the physical properties. As a result, the tensile strength was 23 MPa, the elongation at break was 400% or more, the Izod impact was 300 J/m, Rockwell hardness (R scale) was 70 and the heat deformation temperature under 455 KPa was 115° C., and no electric charge was observed, as indicated in Table 10.

Observation of the molded article using an electron microscope revealed that the PP resin formed a matrix phase, and the reclaimed rubber obtained from the EPDM rubber formed a dispersion phase. The EPDM particle exhibited a fine dispersion of about 5 μm. Since the molded article in this example contained a large amount of the carbon black in the rubber phase of the reclaimed rubber, it exhibited the properties different from those of Comparative 12 shown below in which no carbon black was added.

These satisfactory results described above may be attributable to the fact that the carbon black contained in the reclaimed rubber did not migrate into the matrix phase consisting of the PP resin since it was bound to the EPDM whereby causing no deterioration of the physical properties.

(Comparative 12)

A non-vulcanized EPR (ethylene propylene rubber) and a non-vulcanized EBR (ethylene butylene rubber) were prepared. The both contained neither of vulcanizing agents nor carbon black. These non-vulcanized EPR and non-vulcanized EBR were melt-kneaded at 230° C. Otherwise, the manner similar to that in Example 7 was employed to obtain a molded article.

As shown in Table 10, various physical parameters of the molded article were poorer than those observed in Example 7.

TABLE 10

|  | Example 7 | (parts by weight) Comparative 12 |
|---|---|---|
| Reclaimed EPDM | 30(CB50%)* | — |
| Non-vulcanized EPR, EBR | — | 15, 15 |
| PP | 70 | 70 |
| Talc | 10 | 10 |
| Tensile strength (MPa) | 23 | 18 |
| Elongation at break (%) | 400 or more | 400 or more |
| Isod impact (J/m) | 300 | 250 |
| Rockwell hardness (R scale) | 70 | 65 |
| Heat deformation temperature (455KPa) | 115° C. | 110° C. |
| Electric charge | none | observed |
| particle size (μm) | 5 | 5 |
| Surface quality | good | good |

*CB50% 50 wt % of carbon black contained in each EPDM (Example 8)

A sulfur-crosslinked EPDM rubber scrap containing 50% by weight of a carbon black was employed as a vulcanized rubber and pulverized into about 10 mm square pieces, which were employed as samples for reclamation. As a thermoplastic resin, a pellet of a PP resin was employed.

The vulcanized rubber piece was inserted into a twin screw extruder, in which reclamation was performed at 300° C. Halfway in this process, the PP resin was added using a side-feeder, whereby effecting the reclamation of the vulcanized rubber simultaneously with melt-kneading. After addition of the PP resin, the kneading temperature was lowered to 230° C. The screw speed was 400 rpm, and the output capacity was 5 kg/h, and the ratio between the vulcanized EPDM rubber piece and the PP resin(the vulcanized EPDM rubber piece/the PP resin) was 80 parts by weight/20 parts by weight.

Subsequently, the pellet consisting of the rubber composite obtained by the extrusion process was inserted into an injection molding machine, with which the injection molding was effected at 200° C. to obtain a molded article made from the rubber composite.

The molded article thus obtained was examined for the physical properties. As a result, the tensile strength was 7 MPa, the elongation at break was 430%, and the compression set was 50%.

(Comparative 13)

Using the pellet of the PP resin and the non-vulcanized EPDM rubber containing 50% by weight of the carbon black employed in Example 8, a melting process was conducted at 230° C.

Then the injection molding was effected at 200° C. to obtain a molded article. As a result, the tensile strength was 2 MPa, the elongation at break was 300%, and the compression set was 80%.

(Example 9)

A rubber composition was produced in the same manner of Example 8 but using a pellet of a PE resin instead of the PP resin. As a result, the tensile strength was 5.5 MPa, the elongation at break was 400%, and the compression set was 55%.

(comparative 14)

A rubber composition was produced in the same manner of Comparative 13 but using a pellet of a PE resin instead of the resin. As a result, the tensile strength was 2 MPa, the elongation at break was 250%, and the compression set was 80%.

What is claimed is:

1. A rubber composition comprising (1) a reclaimed rubber obtained by applying a heat and a shear stress to a vulcanized rubber, and (2) a non-vulcanized virgin rubber or/and a thermoplastic resin, wherein said reclaimed rubber contains 40% by weight or more of a residual toluene-insoluble gel component and the network chain density of the rubber in said gel component is 1/20 to 1/4 based on the network chain density of the rubber of the vulcanized rubber.

2. The rubber composition according to claim 1, wherein said residual toluene-insoluble gel component is less than 80% by weight.

3. The rubber composition according to claim 1, wherein said vulcanized rubber is a cross-linked raw rubber in the state of elastomer or rubber.

4. The rubber composition according to claim 1, wherein said vulcanized rubber is at least one selected from the group consisting of rubber products, used rubber waste, scraps from virgin rubber materials, unsuccessfully rubber molded articles.

5. The rubber composition according to claim 1, wherein the % by weight of the gel of a rubber polymer component in the rubber composition is 20 to 70% by weight of a rubber polymer component of the vulcanized rubber.

6. The rubber composition according to claim 1, wherein said non-vulcanized virgin rubber is at least one selected from the group consisting of natural rubbers, butadiene rubbers, isoprene rubbers, butyl rubbers, ethylene-propylene rubbers, styrene-butadiene rubbers, chloroprene rubbers, nitrile rubbers, acryl rubbers, acrylonitrile-butadiene rubbers, epichlorohydrin rubbers, silicon rubbers and ethylene-propylene-diene terpolymers.

7. The rubber composition according to claim 1, wherein the weight ratio of the reclaimed rubber to said non-vulcanized virgin rubber is 5 to 100 parts by weight, to 100 parts by weight.

8. The rubber composition according to claim 1, wherein said reclaimed rubber is dispersed in the rubber composition in a form of a microparticle having a maximum particle size of 100 μm or less.

9. The rubber composition according to claim 1, wherein said reclaimed rubber binds chemically to said virgin rubber or/and said thermoplastic resin at a radical active point on the surface of a particle of the reclaimed rubber.

10. The rubber composition according to claim 1, wherein said thermoplastic resin is capable of reacting with a radical formed by devulcanizing the vulcanized rubber.

11. The rubber composition according to claim 1, wherein said thermoplastic resin is at least one selected from the group consisting of polyamide resins, polyester resins, polyacrylonitrile resins, thermoplastic polyurethane resins, polypropylene resins, polyethylene resins, polystyrene-based resins, acrylonitrile-styrene-based resins, polycarbonates and polyacetal resins.

12. The rubber composition according to claim 1, wherein the weight ratio of said thermoplastic resin to the vulcanized rubber (thermoplastic resin/vulcanized rubber) is within a range from 5/95 to 95/5.

13. The rubber composition according to claim 1, wherein the reclaimed rubber to which carbon black is added is dispersed in the thermoplastic resin, and rubber molecules in the reclaimed rubber form a carbon gel together with the carbon black.

14. The rubber composition according to claim 13, wherein said carbon gel comprises a gelled material formed of said rubber molecule and said carbon black.

15. The rubber composition according to claim 13, wherein 90% or more of said carbon black added to the reclaimed rubber forms the carbon gel.

16. The rubber composition according to claim 13, wherein the amount of said carbon black in the reclaimed rubber is 5 to 60% by weight.

17. A method for producing a rubber composition comprising the steps of:

treating a vulcanized rubber with a heat and a shear stress to obtain a reclaimed rubber wherein 40% by weight or more of a residual toluene-insoluble gel component is present and the network chain density of the rubber in said gel component is 1/20 to 1/4 based on the network chain density of the rubber of the vulcanized rubber; and blending said reclaimed rubber with a non-vulcanized virgin rubber or/and a thermoplastic resin to form said rubber composition.

18. The method according to claim 17, wherein the heating to be applied to the vulcanized rubber is conducted at a temperature enabling a cutting of the crosslinking points in the vulcanized rubber but causing no preceding cutting of the main chain of the rubber molecule.

19. The method according to claim 17, wherein said heating temperature is within a range of 180° C. to 350° C.

20. The method according to claim 17, wherein said shear stress is within a range of 10 to 150 kg/cm$^2$.

21. The method according to claim 17, wherein said vulcanized rubber contains a carbon black and is heated in the state of coexistence with a thermoplastic resin under a shear stress.

* * * * *